United States Patent
Suzuki

(10) Patent No.: US 6,584,115 B1
(45) Date of Patent: Jun. 24, 2003

(54) MULTIUSER INTERFERENCE CANCELER FOR DS-CDMA SYSTEM

(75) Inventor: Hideto Suzuki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/338,396

(22) Filed: Jun. 22, 1999

(30) Foreign Application Priority Data

Jun. 25, 1998 (JP) ............................................. 10-178854

(51) Int. Cl.[7] .............................................. H04B 7/216
(52) U.S. Cl. ........................ 370/441; 370/332; 370/342; 370/535
(58) Field of Search ................................ 370/342, 441, 370/479, 320, 332, 335, 473, 474, 410, 496, 268, 269, 333, 420, 426, 532, 535, 536, 537, 542, 522

(56) References Cited

U.S. PATENT DOCUMENTS

| | | | | |
|---|---|---|---|---|
| 5,363,403 A | * | 11/1994 | Schilling et al. | 370/342 |
| 5,467,368 A | * | 11/1995 | Takeuchi et al. | 370/241.1 |
| 5,550,810 A | * | 8/1996 | Monogioudis et al. | 370/342 |
| 5,553,062 A | * | 9/1996 | Schilling et al. | 370/479 |
| 5,579,304 A | * | 11/1996 | Sugimoto et al. | 370/342 |
| 5,719,852 A | * | 2/1998 | Schilling et al. | 370/201 |
| 5,757,791 A | * | 5/1998 | Kanterakis et al. | 370/342 |
| 6,192,067 B1 | * | 2/2001 | Toda et al. | 375/140 |

* cited by examiner

Primary Examiner—Dang Ton
Assistant Examiner—Thong N. Vu
(74) Attorney, Agent, or Firm—Dickstein, Shapiro, Morin & Oshinsky, LLP.

(57) ABSTRACT

A multiuser interference canceler which is used in a DS-CDMA (direct sequence-code division multiple access) communication system and is capable of preventing reception quality from being degraded. In a serial multiuser interference canceler which has cascaded blocks each having an interference canceler units (ICUs) for generating interference replica signal, preliminary demodulators for measuring reception quality of the signals of the users in the received signal are provided. If the reception quality of output signals from the preceding block is more degraded than the reception quality measured by the preliminary demodulators, then each of the interference canceler units determines that the reception quality has been degraded by an interference cancellation process in the preceding block, and controls the interference canceler unit in the preceding block to turn off the outputting of the interference replica signal.

13 Claims, 9 Drawing Sheets

MULTIUSER INTERFERENCE CANCELER FOR DS-CDMA SYSTEM

BACKGROUND OF THE INVENTION

1. Field of the Invention

The present invention relates to a DS-CDMA (Direct Sequence-Code Division Multiple Access) system which is one of CDMA communication systems, and more particularly to a multiuser interference canceler, which is used in a DS-CDMA system, for processing a received signal containing spread signals from a plurality of users to remove signals of other users from a signal of each user and thereafter decode the signal of each user.

2. Description of the Related Art

In recent years, CDMA communication systems that are resistant to interference and jamming have attracted much attention as mobile communication systems. In a CDMA communication system, a transmitting station spreads a user signal to be transmitted with a spreading code and transmits the spread user signal, and a receiving station despreads the received user signal with a spreading code which is the same as the spreading code in the transmitting station for thereby obtaining the original user signal.

In the CDMA communication system, a plurality of transmitting stations spread user signals with different orthogonal spreading codes, and a plurality of receiving stations select respective spreading codes for use in despreading the received user signals for thereby specifying the respective user signals. Consequently, a common frequency band can be used to transmit a plurality of the user signals from the transmitting stations to the receiving stations.

However, because not all spreading codes are made orthogonal to each other, the signal of a user may possibly serve as noise with respect to another user, resulting in interference. Therefore, if a plurality of users use a link with a common frequency within one cell, the signals of the users tend to interfere with each other, resulting in a reduction in the bit energy to noise ratio (Eb/No) which is the ratio of the desired reception wave power to interfering wave power. Because the Eb/No determines the quality of communications, it is necessary to attain an Eb/No having at least a certain value in order to obtain a desired quality of communications. Such an Eb/No having at least a certain value is referred to as a required Eb/No.

The number of links that can use a common frequency within one cell is limited to a number that can maintain the required Eb/No. For increasing a system capacity for subscribers, any interference between communication links must be lowered.

One proposed method of reducing any interference within cells, increasing a system capacity for subscribers, or improving the quality of communications in the DS-CDMA communication system is a multiuser interference canceling method which employs a multiuser interference canceler.

The multiuser interference canceling method is a method in which when a received signal containing the signals of a plurality of users is to be demodulated by a spreading code of a certain user, an interference replica component which is the same as a signal component other than the user is generated and subtracted from the received signal to be demodulated in a multiplicity of stages for thereby reducing interference from the other users. There are two types of multiuser interference cancelers, i.e., a serial multiuser interference canceler and a parallel multiuser interference canceler. The principles of the serial multiuser interference canceler are described in Technical Report (RC95-50) of the Institute of Electronics, Information and Communication Engineers, "Sequential channel estimating serial canceler using a pilot symbol in DS-CDMA", for example. Japanese laid-open patent publication No. 09-270736 (JP, 09270736, A) entitled "DC-CDMA multiuser serial interference canceler device" discloses a type of serial multiuser interference canceler.

The conventional serial multiuser interference canceler disclosed in the above publication is shown in FIG. 1.

The serial multiuser interference canceler shown in FIG. 1 is designed for three users and comprises first, second, and third stages for effecting an interference cancellation process with an interference replica signal and three decoders $19a$–$19c$. Each of the first, second, and third stages comprises three blocks. Therefore, the serial multiuser interference canceler has a total of nine blocks.

These nine blocks have respective interference canceler units (ICUs) $61a$, $61b$, $61c$, $62a$, $62b$, $62c$, $63a$, $63b$, $63c$. Each of the blocks also has, in addition to the ICU, a delay memory (D) and a subtractor and/or an adder. For example, the first block of the first stage comprises an ICU $61a$, a delay memory 3, and a subtractor 4, and the first block of the second stage comprises an ICU $62a$, delay memories 5 and 7, an adder 8, and a subtractor 6. Each of the second and third blocks of the first stage is identical in structure to the first block of the first stage. Each of the blocks of the second and third stages, except the third block of the third stage, is identical in structure to the first block of the second stage.

Each of the ICUs $61a$, $62a$, $63a$ generates an interference replica signal which is the same as the signal component of the first user. Each of the ICUs $61b$, $62b$, $63b$ generates an interference replica signal which is the same as the signal component of the second user. Each of the ICUs $61c$, $62c$, $63c$ generates an interference replica signal which is the same as the signal component of the third user.

The arrangement of the ICU $61a$, as an example of the ICUs $61a$–$63c$, will be described below with reference to FIG. 2.

The ICU $61a$ comprises a plurality of despreaders $-71_1$–$71_n$, a rake combiner 26, a decision unit 27, and a plurality of respreaders $72_1$–$72_n$. Each of the despreaders $71_1$–$71_n$ comprises a pair of multipliers 22 and 25, an integrator 23, and a transmission path estimator 24. A received signal 1 that is supplied to the ICU $61a$ is multiplied by a spreading code Ca by the multiplier 22, and then integrated by the integrator 23, which produces a correlated value. The transmission path estimator 24 determines a transmission path fading vector $\xi$ from the correlated value determined by the integrator 23. The multiplier 45 multiplies the correlated value from the integrator 23 by the inverse $\xi$ of the transmission path fading vector $\xi$ from the transmission path estimator 24 for thereby performing phase correction for the received signal.

The received signals from paths which have been corrected in phase by the multipliers 25 of the despreaders $71_1$–$71_n$ are combined by the rake combiner 26, and the combined signal is decoded into an original symbol sequence by the decision unit 27. Since the rake combiner 26 and the decision unit 27 are of general nature in the CDMA communication system and do not have direct bearing on the operation of the multiuser interference canceler, they will not be described in detail below. However, those skilled in the art will be able to construct the rake combiner 26 and the decision unit 27 with ease.

Each of the respreaders $72_1$–$72_n$ comprises a pair of multipliers 28 and 29. In each of the respreaders $72_1$–$72_n$, the multiplier 28 multiplies the original symbol sequence by the transmission path fading vector $\xi$ of one of the paths to impart original transmission path characteristics to the original symbol sequence. Thereafter, the original symbol sequence is spread with the spreading code Ca by the multiplier 49. The signals from the respreaders $72_1$–$72_n$ are combined into a chip-rate interference replica signal 81a, which is outputted from the ICU 61a.

In FIG. 2, the signal supplied from the rake combiner 26 to the decision unit 27 is branched and outputted to an external circuit. Such a signal branching arrangement is included in only the ICUs 63a, 63b, 63c in the third stage. From the ICUs 63a, 63b, 63c, the signals are supplied to the decoders 19a, 19b, 19c, respectively.

For the sake of brevity, operation of the conventional serial multiuser interference canceler shown in FIG. 1 for demodulating the signal of the first user will be described below. The signals of the other users will be demodulated in the same manner as described below.

The ICU 61a is supplied with the received signal 1, generates a signal which is the same as the signal component of the first user contained in the received signal 1, and outputs the generated signal as an interference replica signal 81a. The delay memory 3 stores the received signal 1 and then outputs the received signal 1 after having delayed it for a certain time. The time for which the delay memory 3 delays the received signal 1 is a time required for the ICU 61a to generate the interference replica signal 81a. The subtractor 4 subtracts the interference replica signal 81a from the received signal 1 outputted from the delay memory 3, and then outputs the differential signal. Therefore, the differential signal outputted by the subtractor 4 contains only the signal of the second user and the signal of the third user.

In the second block of the first stage, the subtractor 4 subtracts the signal of the second user from the signal outputted from the delay memory 3. In the third block of the first stage, the subtractor 4 subtracts the signal of the third user from the signal outputted from the delay memory 3.

Upon completion of the processing in the first stage, therefore, the interference replica signals of all the users have been subtracted from the received signal 1, leaving a residual signal, which is supplied to the first block of the second stage.

In the first block of the second stage, the adder 8 adds the interference replica signal 81a which has been delayed by the delay memory 7 for a certain time, to the residual signal from the first stage. Therefore, the output signal from the adder 8 contains only the signal component of the first user. The ICU 62a is supplied with the output signal from the adder 8, and generates and outputs an interference replica signal 82a. The output signal from the adder 8 is also supplied to the delay memory 5, which delays the signal for a certain time and outputs the delayed signal to the subtractor 6. The subtractor 6 subtracts the interference replica signal 82a from the delayed signal from the delay memory 5.

The signal outputted from the subtractor 6 after the processing in the first block of the second state is a residual signal that does not contain any signals of the users.

The same processing as described above is carried out in the second block of the second stage through the third block of the third stage.

In each of the blocks of the third stage, the ICUs 63a–63c output signals from the rake combiners 26 thereof to the respective decoders 19a–19c. The decoders 19a through 19c finally decode the supplied signals.

The signals handled in the first to third stages of the conventional serial multiuser interference canceler are all chip-rate signals.

The conventional parallel multiuser interference canceler will be described below with reference to FIG. 3. The parallel multiuser interference canceler shown in FIG. 3 is also designed for three users as with the serial multiuser interference canceler shown in FIG. 1. Those parts of the parallel multiuser interference canceler shown in FIG. 3 that are identical to those shown in FIG. 1 are denoted by identical reference numerals.

As shown in FIG. 3, the parallel multiuser interference canceler comprises first, second, and third stages, and three decoders 19a–19c. The first stage comprises a delay memory 51, three ICUs 61a–61c, an adder 57, a subtractor 54, and three adders 58a–58c. The second stage comprises a delay memory 52, three ICUs 62a–62c, an adder 59, a subtractor 55, and three adders 60a–60c. The third stage comprises a delay memory 53, three ICUs 63a–63c, an adder 64, a subtractor 56, and three adders 65a–65c.

In the first stages, the ICUs 61a–61c, which are connected parallel to each other, generate respective interference replica signals 81a–81c which are the same as the signal components of the first to third users. The interference replica signals 81a–81c are combined by the adder 57 into a signal that is subtracted by the subtractor 54 from a received signal 1 that has been delayed for a certain time by the delay memory 51. Therefore, the subtractor 54 outputs a residual signal that is free of the interference replica signals of all the users. The residual signal is then added to the interference replica signals 81a–81c in the first stage by the adders 58a–58c. The interference replica signals 81a–81c to which the residual signal has been added are supplied to the respective ICUs 62a–62c of the second stage.

The second and third stages also perform the same processing operation as the processing operation, described above, of the first stage. The decoders 19a–19c finally decode respective signals supplied from the third stage.

In the above conventional multiuser interference canceler, the interference replica signal is estimated and reproduced from the received signal, and the interference replica signal is subtracted from the received signal. Therefore, the accuracy with which the interference replica signal is reproduced significantly affects the characteristics of the interference canceler. Factors which are responsible for the accuracy with which the interference replica signal is reproduced are the accuracy of the transmission path fading vector $\xi$ extracted by the transmission path estimator 24 in each ICU and the error ratio of the hard decision result carried out by the decision unit 27 after the rake combining.

The transmission path fading vector $\xi$ represents an estimation of characteristics added on the transmission path of the interfering user, and the hard decision value represents an estimation of the transmitted sequence. Either one of the transmission path fading vector $\xi$ and the hard decision value is closely related to the ratio of desired signal power to noise power of the received signal. As the ratio of desired signal power to noise power is deteriorated, the error of the transmission path fading vector $\xi$ and the error rate of the hard decision value are rendered poorer. Therefore, the accuracy with which the interference replica signal is reproduced is also reduced. While the ratio of desired signal power to noise power may be expressed as "SN ratio", "SIR", "Eb/No", etc., it will be expressed as "Eb/No" herein.

The conventional multiuser interference cancelers have a problem in that since interference replica signals are uniformly reproduced for interference cancellation even when the Eb/No is low, the reception quality is degraded in regions where the Eb/No of the received signal is low.

In the actual environments of mobile communication systems, furthermore, the reception quality is sometimes degraded by time-dependent changes due to fading of individual signals and external noise when the multiuser interference canceler is operated in regions where the Eb/No of the received signal is not significantly low.

Consequently, the conventional multiuser interference cancelers have suffered the following disadvantages:

(1) The reception quality is degraded when interference cancellation is performed in regions where the Eb/No of the received signal is low.

(2) If the received signal suffers time-dependent changes due to fading of individual signals and external noise, then the reception quality may be also degraded when the multiuser interference canceler is operated.

SUMMARY OF THE INVENTION

It is an object of the present invention to provide a multiuser interference canceler which is capable of preventing reception quality from being degraded in all operating environments.

According to a first aspect of the present invention, there is provided a DS-CDMA multiuser interference canceler for processing a received signal containing spread signals from a plurality of users to remove signals of other users from a signal of each user and thereafter decode the signal of each user, comprising a first stage comprising a plurality of series-connected blocks having respective first interference canceler units associated respectively with the users, for generating and outputting interference replica signals which are identical to signal components of the users, and respective first subtracting means for subtracting the interference replica signals from the received signal, a plurality of second stages comprising a plurality of series-connected blocks having respective adding means associated respectively with the users, for adding interference replica signals of the users generated in a preceding stage to signals from a preceding block, respective second interference canceler units for generating again interference replica signals which are identical to the signal components of the users from output signals from the adding means, and respective second subtracting means for subtracting the interference replica signals which have been generated again from the output signals from the adding means and outputting differential signals to a next block, a plurality of decoding means for decoding symbols generated in a final one of the second stages, and a plurality of preliminary demodulating means for measuring reception quality of the signals of the users contained in the received signal, each of the first and second interference canceler units comprising means for controlling an interference canceler unit in a preceding block to turn off the outputting of the interference replica signal if the reception quality of output signals from the preceding block is more degraded than the reception quality of the signals of the users which has been measured by the preliminary demodulating means.

In the above DS-CDMA multiuser interference canceler, which is of the serial type, if the reception quality of output signals from the preceding block is more degraded than the reception quality of the signals of the users which has been measured by the preliminary demodulating means, then each of the interference canceler units determines that the reception quality has been degraded by an interference cancellation process in the preceding block, and controls the interference canceler unit in the preceding block to turn off the outputting of the interference replica signal. The DS-CDMA multiuser interference canceler is therefore capable of preventing the reception quality from being degraded by an interference cancellation process.

According to a second aspect of the present invention, there is provided a DS-CDMA multiuser interference canceler for processing a received signal containing spread signals from a plurality of users to remove signals of other users from a signal of each user and thereafter decode the signal of each user, comprising a first stage comprising a plurality of series-connected blocks having respective first interference canceler units associated respectively with the users, for generating and outputting interference replica signals which are identical to signal components of the users, and measuring reception quality of the signals of the users, and respective first subtracting means for subtracting the interference replica signals from the received signal, a plurality of second stages comprising a plurality of series-connected blocks having respective adding means associated respectively with the users, for adding interference replica signals of the users generated in a preceding stage to signals from a preceding block, respective second interference canceler units for generating again interference replica signals which are identical to the signal components of the users from output signals from the adding means and measuring reception quality of the signals of the users, and respective second subtracting means for subtracting the interference replica signals which have been generated again from the output signals from the adding means and outputting differential signals to a next block, a plurality of decoding means for decoding symbols generated in a final one of the second stages, a plurality of preliminary demodulating means for measuring reception quality of the signals of the users contained in the received signal, and cancellation on/off central control means for controlling an interference canceler unit in an either one of the stages preceding the one of the second stages to turn off the outputting of the interference replica signal if the reception quality measured by the second interference canceler units in one of the second stages is more degraded than the reception quality of the users measured by the preliminary demodulating means, until the reception quality measured by all the interference canceler units in said stage becomes better than the reception quality of the users measured by the preliminary demodulating means.

In the above DS-CDMA multiuser interference canceler, which is of the serial type, all the information of the reception quality measured by the interference canceler units is supplied to the cancellation on/off central control means, which makes an appropriate decision to determine an interference canceler unit which is to turn off an interference cancellation process. Therefore, the turning on and off of the interference cancellation process in the interference canceler units in each block can adequately be controlled. The interference canceler unit controlled to turn off the outputting of the interference replica signal should preferably be one of the interference canceler units, whose reception quality is worst, in a stage preceding said stage.

According to a third aspect of the present invention, there is provided a DS-CDMA multiuser interference canceler for processing a received signal containing spread signals from a plurality of users to remove signals of other users from a signal of each user and thereafter decode the signal of each user, comprising a first stage comprising a plurality of first interference canceler units associated respectively with the users, for generating and outputting interference replica signals which are identical to signal components of the users, and measuring reception quality of the signals of the users, first adding means for adding the interference replica signals, and first subtracting means for subtracting an output signal of the first adding means from the received signal, a plurality of second stages comprising a plurality of second adding means associated respectively with the users, for adding interference replica signals of the users generated in a preceding stage to signals from a preceding stage, respective second interference canceler units for generating again interference replica signals which are identical to the signal components of the users from output signals from the second adding means and measuring reception quality of the signals of the users, respective third adding means for adding the interference replica signals generated again by the second interference canceler units, and respective second subtracting means for subtracting output signals of the third adding means from the received signal and outputting differential signals to a next stage, a plurality of decoding means for decoding symbols generated in a final one of the second stages, a plurality of preliminary demodulating means for measuring reception quality of the signals of the users contained in the received signal, and cancellation on/off central control means for controlling an interference canceler unit in an either one of the stages preceding the one of the second stages to turn off the outputting of the interference replica signal if the reception quality measured by the second interference canceler units in one of the second stages is more degraded than the reception quality of the users measured by the preliminary demodulating means, until the reception quality measured by all the interference canceler units in said stage becomes better than the reception quality of the users measured by the preliminary demodulating means.

In the above DS-CDMA multiuser interference canceler, which is of the parallel type, all the information of the reception quality measured by the interference canceler units is supplied to the cancellation on/off central control means, which makes an appropriate decision to determine an interference canceler unit which is to turn off an interference cancellation process. Therefore, the turning on and off of the interference cancellation process in the interference canceler units in each block can adequately be controlled.

Rather than simply turning off the interference cancellation process which is liable to degrade the reception quality, the output level of the interference replica signal may be reduced for making the reception quality more uniform.

The above and other objects, features, and advantages of the present invention will become apparent from the following description based on the accompanying drawings which illustrate examples of preferred embodiments of the present invention.

DESCRIPTION OF THE PREFERRED EMBODIMENTS

First Embodiment

Figure 4:
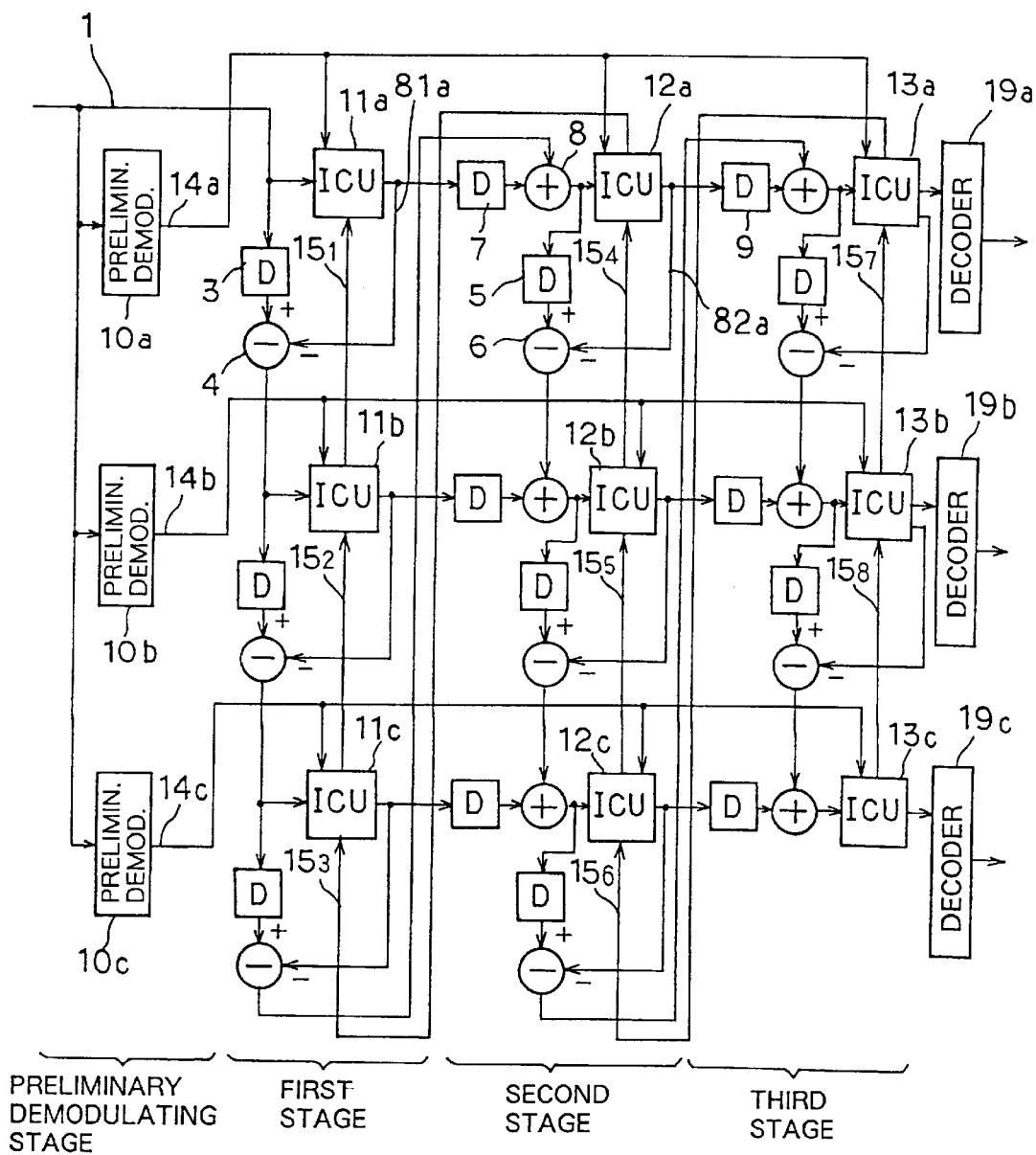
FIG. 4 is a block diagram of a serial DS-CDMA multiuser interference canceler according to a first embodiment of the present invention.

FIG. 4 shows in block form a serial DS-CDMA multiuser interference canceler according to a first embodiment of the present invention. Those parts of the serial multiuser interference canceler shown in FIG. 4 which are identical to those shown in FIG. 1 are denoted by identical reference numerals.

Figure 1:
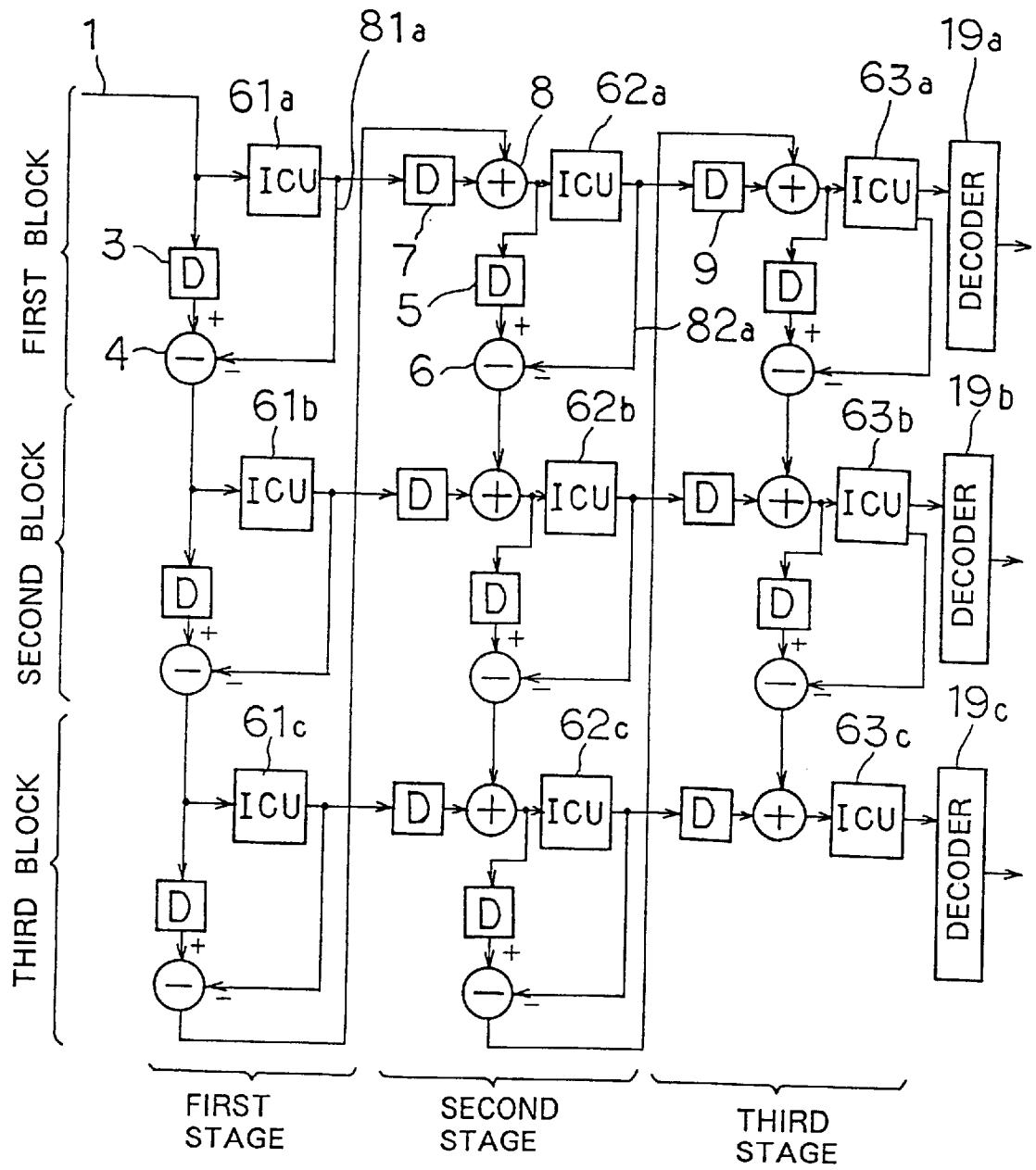
FIG. 1 is a block diagram of a conventional serial multiuser interference canceler.

The multiuser interference canceler shown in FIG. 4 differs from the conventional multiuser interference canceler shown in FIG. 1 in that it has an additional preliminary demodulating stage comprising three preliminary demodulators $10a$, $10b$, $10c$ and a plurality of ICUS $11a$–$13c$ in place of the ICUs $61a$–$63c$. Each construction of ICUs $11a$–$13c$ is different from that of the ICUs $61a$–$63c$.

The preliminary demodulators $10a$, $10b$, $10c$ measure Eb/No and bit error rates (BERS) of the user signals contained in the received signal 1, and output the measured results as reception quality signals $14a$, $14b$, $14c$. The reception quality signal $14a$ is supplied to the ICUs $11a$, $12a$, $13a$, the reception quality signal $14b$ to the ICUs $11b$, $12b$, $13b$, and the reception quality signal $14c$ to the ICUs $11c$, $12c$, $13c$. The reception quality signals $14a$, $14b$, $14c$ may be supplied to the ICUs $11a$–$13c$ in any of various ways. For example, they may be combined with the received signal 1 according to time-division multiplexing process, and the multiplexed signals may be supplied to the ICUs $11a$–$13c$, or may be supplied along other lines to the ICUs $11a$–$13c$.

The arrangement of the ICU $12a$, as an example of the ICUs $11a$–$13c$, will be described below with reference to FIG. 5.

Figure 2:
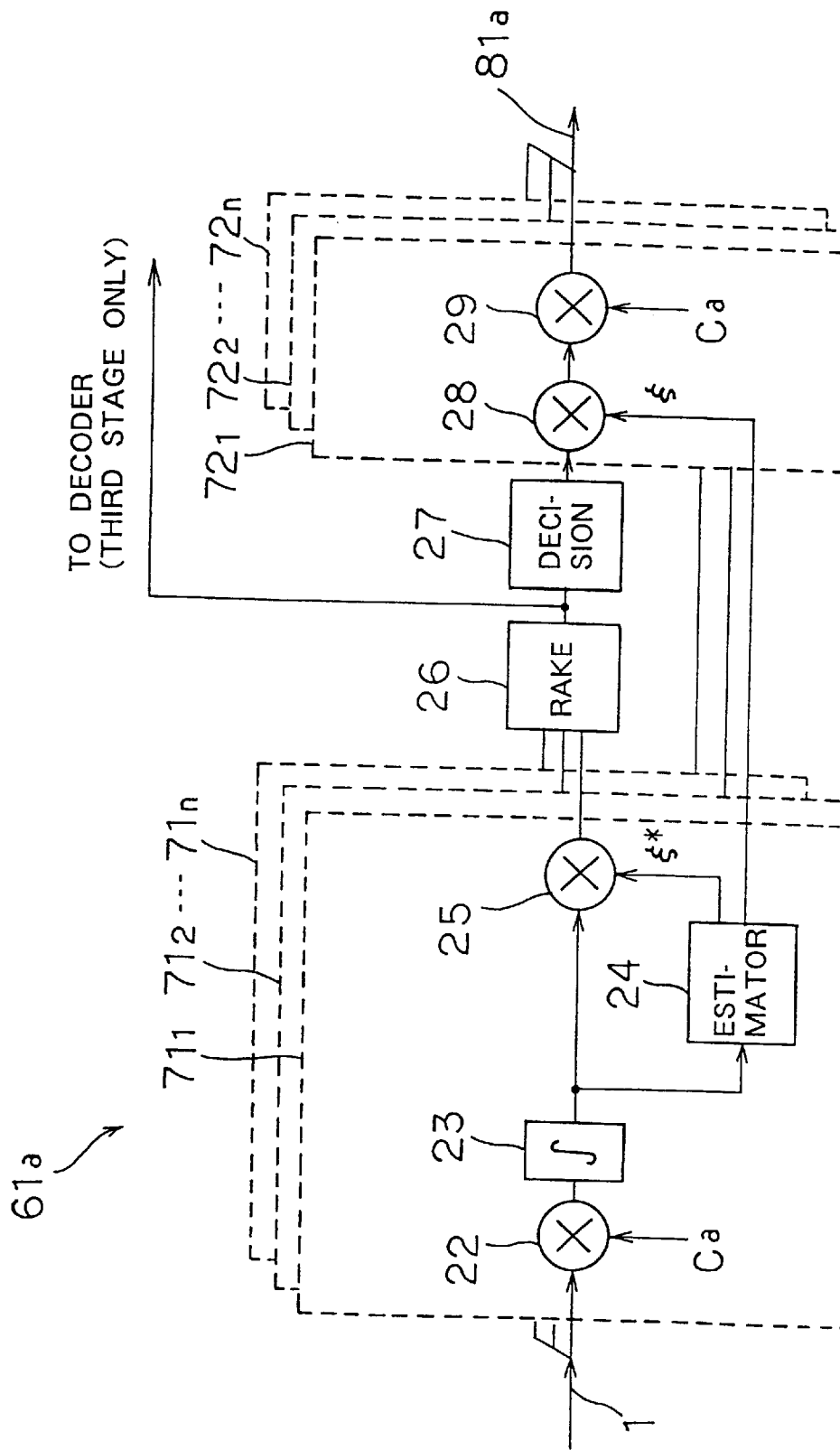
FIG. 2 is a block diagram of an interference canceler unit (ICU) in the conventional serial multiuser interference canceler shown in FIG. 1.
Figure 5:
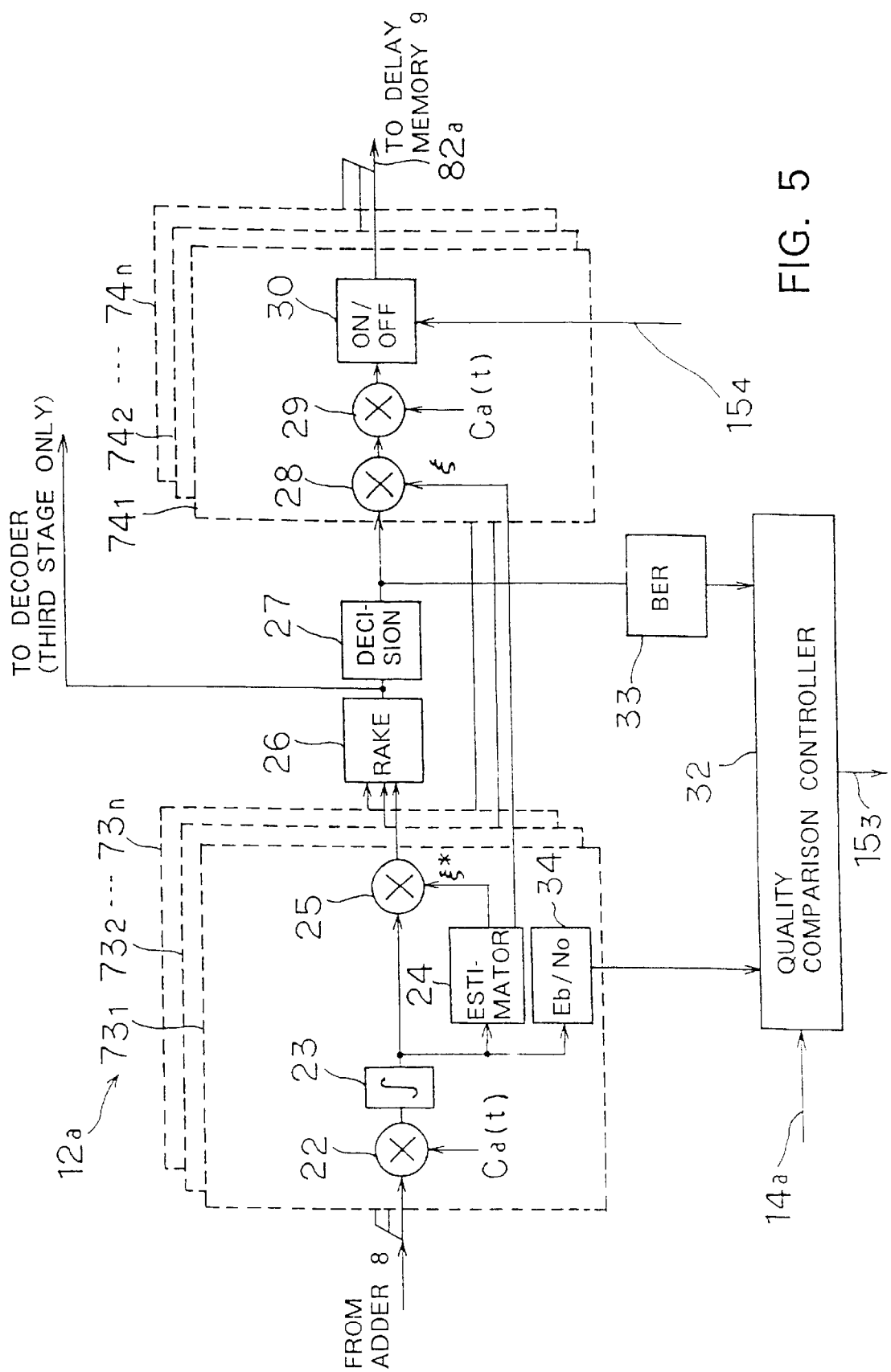
FIG. 5 is a block diagram of an ICU in the serial multiuser interference canceler shown in FIG. 4.

As shown in FIG. 5, the ICU $12a$ differs from the conventional ICU $61a$ shown in FIG. 2 in that it has a plurality of despreaders $73_1$–$73_n$ in place of the despreaders $71_1$–$71_n$, a plurality of respreaders $74_1$–$74_n$ in place of the respreaders $72_1$–$72_n$, and additionally has a bit error rate (BER) measuring unit 33 and a quality comparison controller 32.

Each of the despreaders $73_1$–$73_n$ is similar in structure to the despreaders $71_1$–$71_n$ shown in FIG. 2 except that it additionally has an Eb/No measuring unit 34. The Eb/No measuring unit 34 determines an Eb/No from the correlated value determined by the integrator 23, and outputs the determined Eb/No.

Each of the respreaders $74_1$–$74_n$ is similar in structure to the respreaders $72_1$–$72_n$ shown in FIG. 2 except that it additionally has an on/off controller 30. The on/off controller 30 outputs the signal from the multiplier 29 as an interference replica signal $82a$ if a control signal $15_4$ is not applied thereto, and does not output the signal from the multiplier 29 as an interference replica signal 82a if a control signal $15_4$ is applied thereto.

The BER measuring unit 33 serves to measure a bit error rate of a pilot symbol (PL) of the correlated value outputted from the decision unit 27 by comparing the pilot symbol with a symbol pattern of a known pilot symbol.

The quality comparison controller 32 compares the Eb/No measured by the Eb/No measuring unit 34 with the Eb/No of the received signal 1 which has been supplied as the reception quality signal 14a, and outputs a control signal $15_3$ if the Eb/No measured by the Eb/No measuring unit 34 is more degraded than the Eb/No of the received signal 1, as determined from the result of the comparison. The quality comparison controller 32 also compares the BER measured by the BER measuring unit 33 with the BER of the received signal 1 which has been supplied as the reception quality signal 14a, and outputs a control signal $15_3$ if the BER measured by the BER measuring unit 33 is more degraded than the BER of the received signal 1, as determined from the result of the comparison. Stated otherwise, if the Eb/No measured by the Eb/No measuring unit 34 is more degraded than the Eb/No of the received signal 1 which has been supplied as the reception quality signal 14a or if the BER measured by the BER measuring unit 33 is more degraded than the BER of the received signal 1 which has been supplied as the reception quality signal 14a, then the quality comparison controller 32 determines that the reception quality has been made poorer by the interference cancellation, and outputs a control signal $15_3$.

As shown in FIG. 4, the ICUs 11a–13b are supplied with respective control signals $15_1$–$15_8$ from the ICUs $11_b$–13c in the next blocks. The ICU 13c in the final block of the third stage does not need to have an on/off controller 30 because the ICU 13c is supplied with no control signal. The ICU 11a in the first block of the first stage may be not have the quality comparison controller 32, the BER measuring unit 33, and the Eb/No measuring unit 34 because it may output no control signal.

Operation of the multiuser interference canceler according to the first embodiment will be described below with reference to FIGS. 4 and 5.

The preliminary demodulators 10a, 10b, 10c preliminarily demodulate the received signal 1, measure the Eb/No of the received signal 1 and the BER of the pilot symbol, and output the measured Eb/No and BER as reception quality signals 14a, 14b, 14c to the ICUs 11a–13c which correspond to the users.

At the same time, the received signal 1 is processed for interference cancellation in each of the first, second, and third stages in the same manner as with the conventional multiuser interference canceler shown in FIG. 1. Finally, processed signals are decoded by the decoders 19a, 19b, 19c.

The quality comparison controllers 32 in the respective ICUs 11a–13c compare the reception quality represented by the Eb/No and the BERs of pilot symbols that are supplied as the reception quality signals 14a, 14b, 14c with the Eb/No supplied from the Eb/No measuring units 34 and the BERs of pilot symbols supplied from the BER measuring units 33. If the reception quality represented by the Eb/No supplied from the Eb/No measuring units 34 and the BERs of pilot symbols supplied from the BER measuring units 33 is more degraded than those supplied as the reception quality signals 14a, 14b, 14c, then the quality comparison controllers 32 output control signals $15_1$–$15_8$ depending on the respective ICUs 11a 13c. The control signals $15_1$–$15_8$ outputted from the ICUs 11b–13c are supplied to the ICUs in preceding blocks. In this manner, the interference cancellation process in those blocks which precede the blocks whose ICUs have detected a degradation of the reception quality is interrupted.

In this embodiment, the reception qualities of the signal before and after the interference cancellation process are compared, and if the reception quality is degraded by the interference cancellation process, then the interference cancellation process in the preceding block is interrupted. Therefore, the reception quality is prevented from being degraded by the interference cancellation process that is performed as with the conventional multiuser interference cancelers.

In this embodiment, the Eb/No of the signal and the BER of the pilot symbol before and after the interference cancellation process are compared. However, only the Eb/No of the signal or the BER of the pilot symbol may be compared for controlling the turning on and off of the interference cancellation process. However, since changes in the reception quality can be detected in greater detail by detecting both the Eb/No and the BER, the turning on and off of the interference cancellation process can be controlled with higher accuracy when both the Eb/No and the BER are detected.

Second Embodiment

Figure 6:
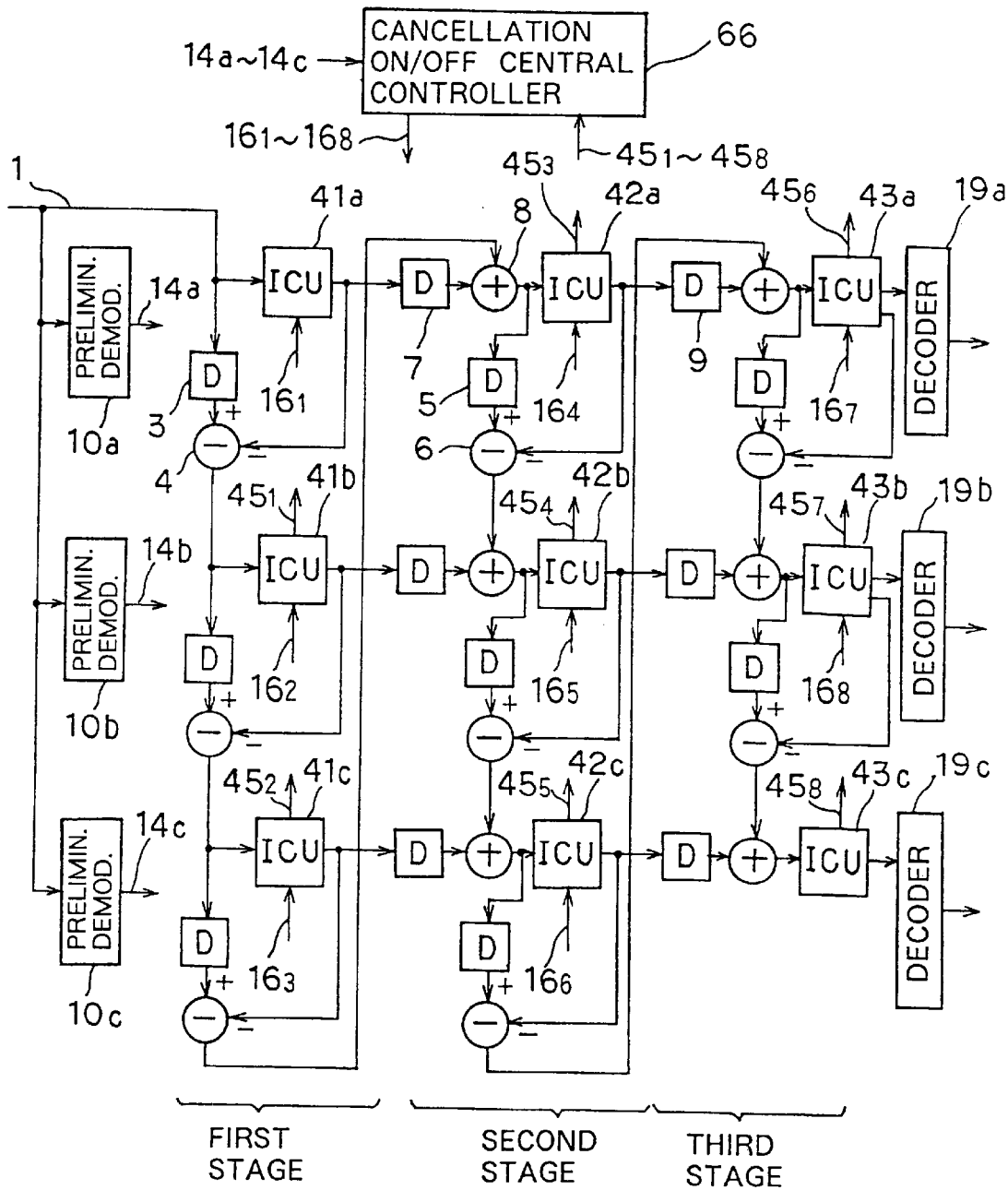
FIG. 6 is a block diagram of a serial DS-CDMA multiuser interference canceler according to a second embodiment of the present invention.

FIG. 6 shows in block form a serial DS-CDMA multiuser interference canceler according to a second embodiment of the present invention. The serial multiuser interference canceler according to the second embodiment differs from the serial multiuser interference canceler shown in FIG. 4 in that it additionally has a cancellation on/off central controller 66 and a plurality of ICUs 41a–43c in place of the ICUs 11a–13c. Those parts of the serial multiuser interference canceler shown in FIG. 6 which are identical to those shown in FIG. 4 are denoted by identical reference numerals. The reception quality signals 14a, 14b, 14c are supplied to the cancellation on/off central controller 66, rather than the ICUs 41a 43c.

The ICUs 41a–43c are different from the ICU 12a shown in FIG. 5 in that the quality comparison controller 32 is dispensed with, and the Eb/No measured by the Eb/No measuring units 34 and the BER of the pilot symbol measured by the BER measuring units 33 are outputted as reception quality signals $45_1$–$45_8$.

The cancellation on/off central controller 66 compares the reception quality signals 14a–14c with the reception quality signals $45_1$–$45_8$ from the ICUs 41b 43c, determines which blocks suffer a degradation in the reception quality, and outputs control signals $16_1$–$16_8$ to determine those ICUs whose interference cancellation process is to be interrupted.

The turning on and off of the interference cancellation process in the ICUs 41a–43c is not controlled by control signals from the ICUs in preceding blocks, but controlled by control signals $16_1$–$16_8$ from the cancellation on/off central controller 66. The ICU 43c in the final block of the third stage does not need to have an on/off controller 30 because the ICU 43c is supplied with no control signal. The ICU 41a in the first block of the first stage does not have the quality comparison controller 32 and the BER measuring unit 33 because it outputs no reception quality signal.

Figure 3:
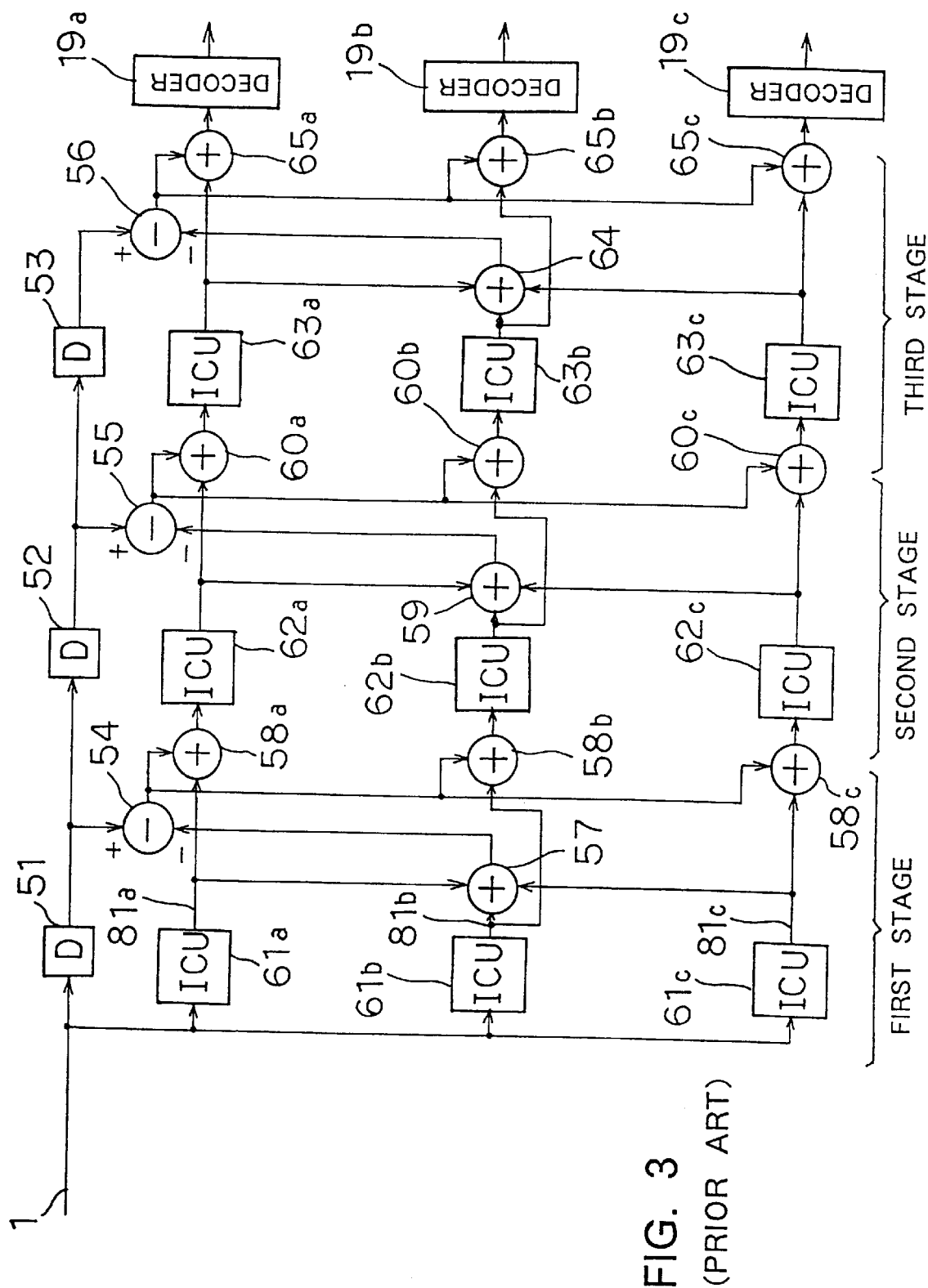
FIG. 3 is a block diagram of a conventional parallel multiuser interference canceler.
Figure 7:
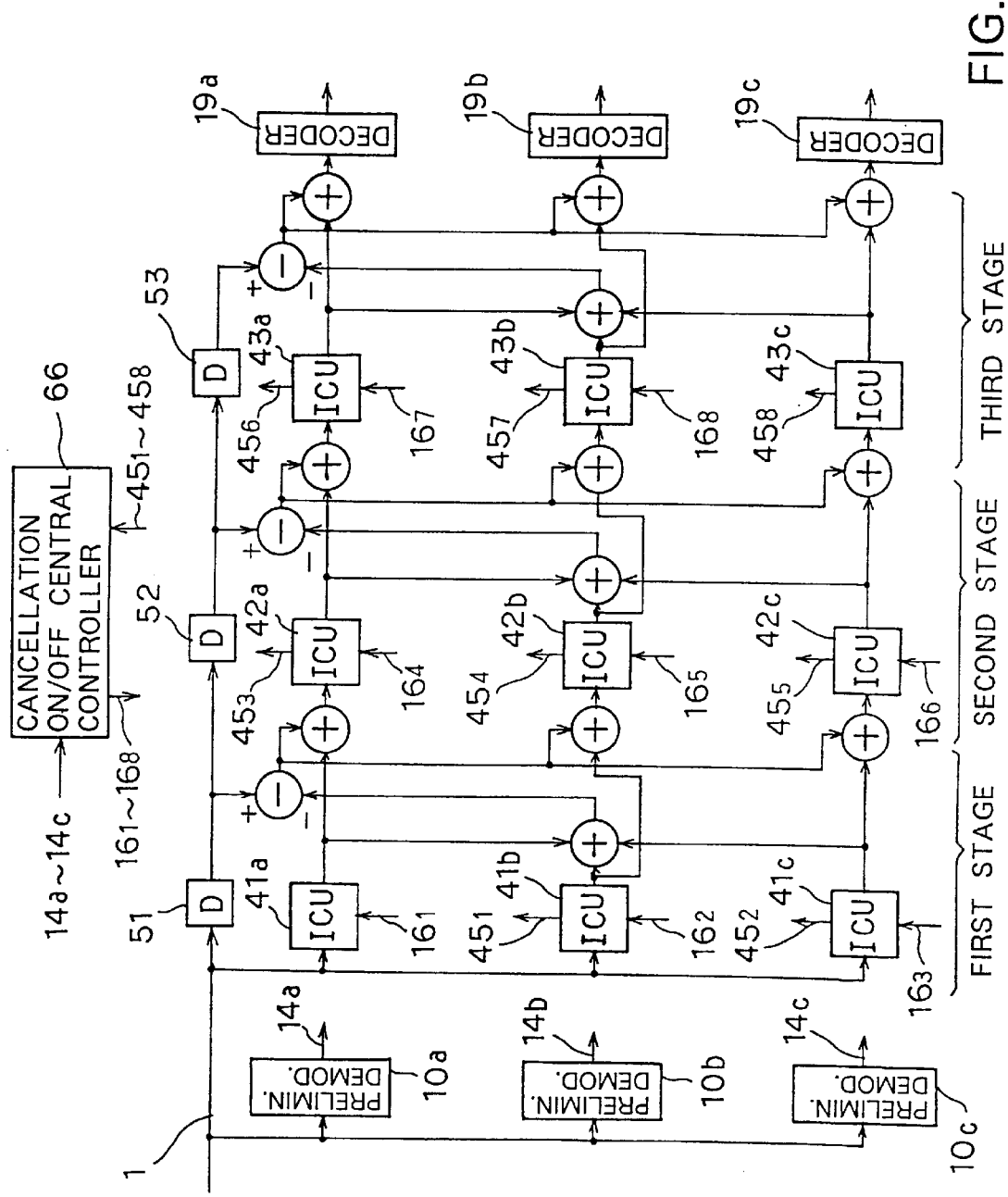
FIG. 7 is a block diagram of a parallel DS-CDMA multiuser interference canceler according to the second embodiment of the present invention.

FIG. 7 shows in block form a parallel DS-CDMA multiuser interference canceler according to the second embodiment of the present invention. The parallel multiuser interference canceler according to the second embodiment differs from the conventional parallel multiuser interference canceler shown in FIG. 3 in that it additionally has three preliminary demodulators 14a, 14b, 14c, a cancellation on/off central controller 66, and a plurality of ICUs 41a–43c in place of the ICUs 61a–63c. Those parts of the parallel multiuser interference canceler shown in FIG. 7 which are identical to those shown in FIG. 3 are denoted by identical reference numerals.

Figure 8:
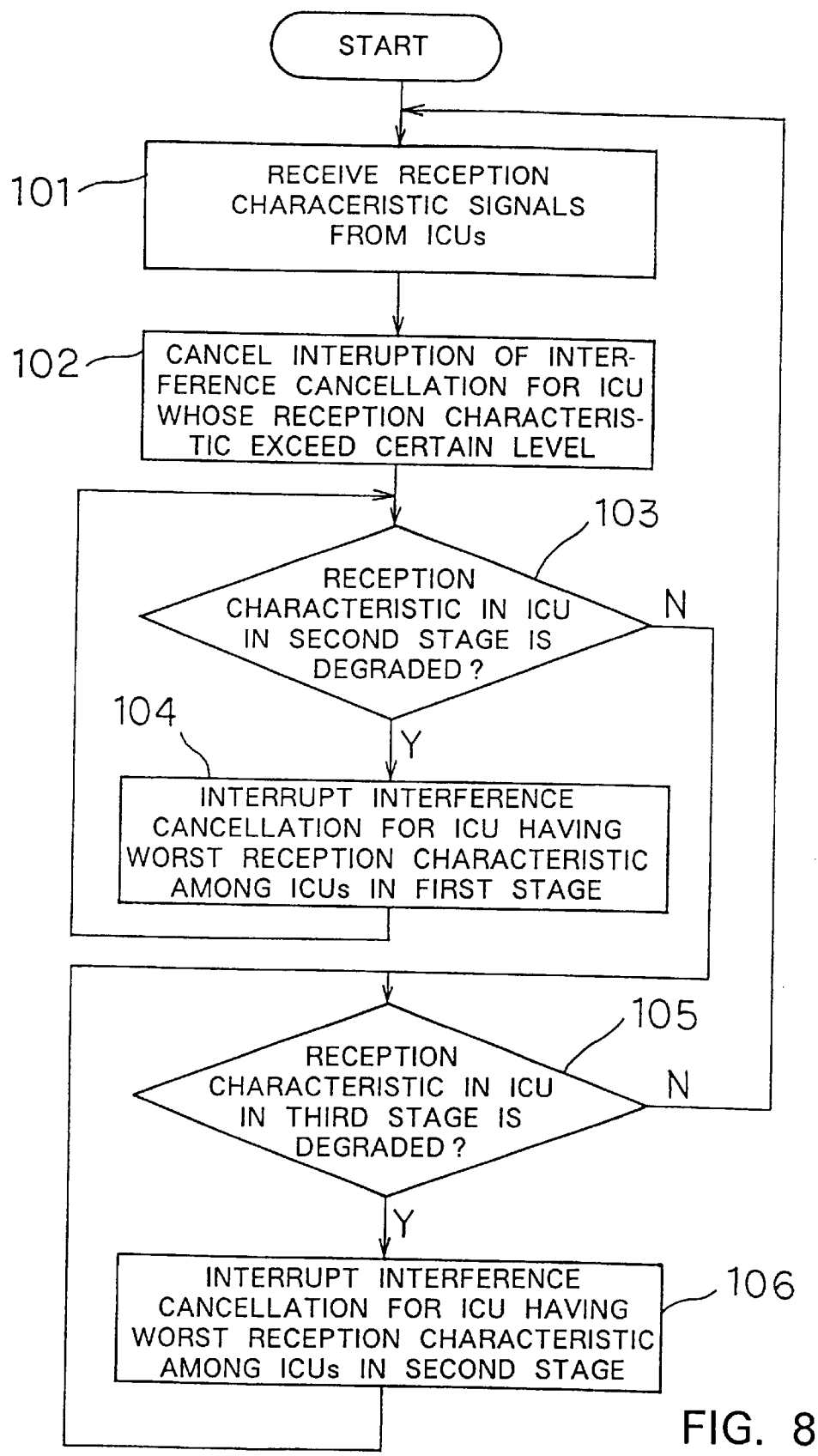
FIG. 8 is a flowchart of an operation sequence of the multiuser interference canceler shown in FIG. 7.

Operation of the multiuser interference cancelers according to the second embodiment will be described below. Since basic operating principles of the serial and parallel multiuser interference cancelers are the same as each other, operation of only the parallel multiuser interference canceler according to the second embodiment will be described below. FIG. 8 shows an operation sequence of the parallel multiuser interference canceler according to the second embodiment shown in FIG. 7.

In step 101, the ICUs 41a–43c supply information of Eb/No and BER in the ICUs 41a–43c, as represented by the reception quality signals $45_1$–$45_8$, to the cancellation on/off central controller 66. Then, in step 102, if the reception quality of a block whose interference cancellation process has been interrupted is improved beyond a certain level, then the interruption of the interference cancellation process is canceled. However, since there is initially no block whose interference cancellation process has been interrupted, nothing occurs at this time.

Then, the cancellation on/off central controller 66 decides, in step 103, whether the reception quality of any one of the ICUs 42a–42c in the second stage is more degraded than the reception quality represented by the reception quality signals 14a–14c. If more degraded, then the cancellation on/off central controller 66 outputs, in step 104, control signals $16_1$–$16_3$ for turning off an interference replica signal of the ICU whose reception quality is worst among the ICUs 41a–41c in the first stage. The processing in steps 103 and 104 is repeated until the second stage contains no blocks in which reception quality is degraded.

If the reception quality of any one of the ICUs 42a–42c in the second stage is not more degraded than the reception quality represented by the reception quality signals 14a–14c in step 103, then the interference cancellation process in the second stage is finished. The cancellation on/off central controller 66 decides, in step 105, whether the reception quality of any one of the ICUs 43a–43c in the third stage is more degraded than the reception quality represented by the reception quality signals 14a–14c. If more degraded, then the cancellation on/off central controller 66 outputs, in step 106, control signals $16_4$–$16_6$ for turning off an interference replica signal of the ICU whose reception quality is worst among the ICUs 42a–42c in the first stage. The processing in steps 105 and 106 is repeated until the third stage contains no blocks in which reception quality is degraded.

If the third stage contains no blocks in which reception quality is degraded, then control goes from step 105 back to step 101. The reception quality by Eb/No and BER is thus supplied again from the ICUs 41b–43c of all the blocks to the cancellation on/off central controller 66 in a given periodic cycle.

If the monitored reception quality of the each user is improved beyond a certain level with time, then it is considered that the reception quality is improved also after the interference cancellation process has started. Therefore, the interruption of the interference cancellation process in a block which has been started in steps 104 and 106 is canceled in step 102.

The processing in steps 101–106 is repeated to prevent the interference cancellation process that tends to degrade the reception quality from being performed.

In the second embodiment, the cancellation on/off central controller 66 first obtains information indicative of which block suffers poor reception quality based on the reception quality signals $45_1$–$45_8$ outputted from the ICUs 41b–43c, and then decides whether the interference cancellation process in the ICUs in the block is to be interrupted or not. Therefore, the cancellation on/off central controller 66 attains all information indicative of which block suffers poor reception quality and then makes an appropriate decision based on the information for controlling the turning on and off of the interference cancellation process in the ICUs in each of the blocks.

In the illustrated second embodiment, if the reception quality of either one of the ICUs in a certain stage is more degraded than the reception quality measured by the preliminary demodulating stage, then the cancellation on/off central controller 66 turns off the interference replica signal in the ICU whose reception quality is worst among the ICUs in the stage that precedes the certain stage. However, since the interference cancellation processes performed in the respective blocks are related to each other, the above control process of the multiuser interference canceler may not necessarily be most effective in preventing the reception quality from being degraded. Accordingly, the second embodiment is not limited to the above control process, but may be arranged such that if the reception quality of either one of the ICUs in a certain stage is more degraded than the reception quality measure by the preliminary demodulating stage, then the cancellation on/off central controller 66 turns off the interference replica signal in the ICU in any preceding stage between the certain stage and the preliminary demodulating stage.

Third Embodiment

Figure 9:
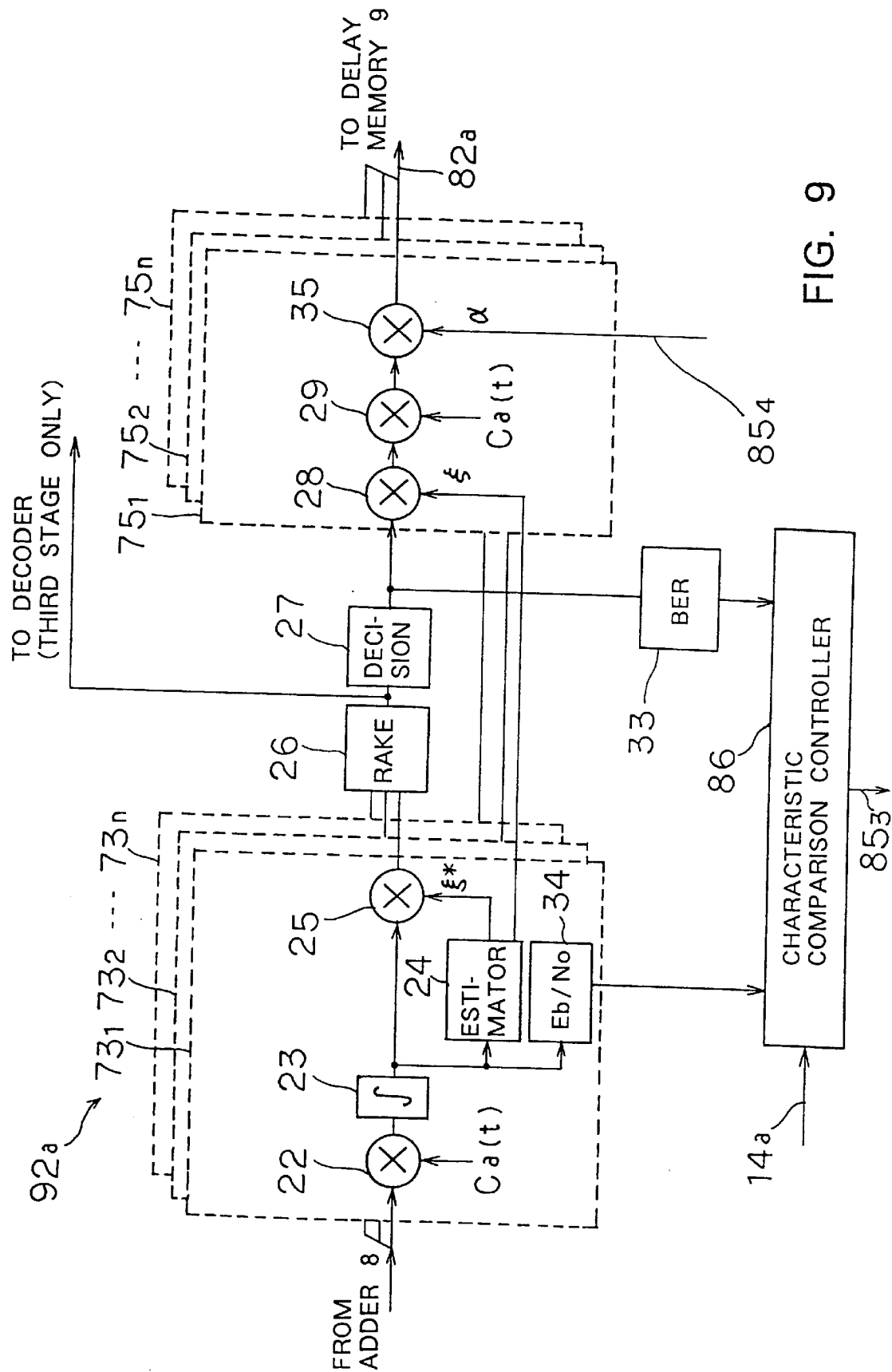
FIG. 9 is a block diagram of an ICU in a DS-CDMA multiuser interference canceler according to a third embodiment of the present invention.

A DS-CDMA multiuser interference canceler according to a third embodiment of the present invention will be described below. The DS-CDMA multiuser interference canceler according to the third embodiment differs from the DS-CDMA multiuser interference canceler according to the first embodiment in that the ICUs 11a–13c according to the first embodiment are replaced with ICUs 91a–93c which are structurally different from the ICUs 11a–13c. The arrangement of the ICU 92a, as an example of the ICUs 91a through 93c, will be described below with reference to FIG. 9. Those parts of the DS-CDMA multiuser interference canceler shown in FIG. 9 that are identical to those shown in FIG. 5 are denoted by identical reference numerals.

The ICU 92a differs from the ICU 12a shown in FIG. 5 in that it has a multiplier 35 in place of the on/off controller 30 and a quality comparison controller 86 in place of the quality comparison controller 32. The quality comparison controller 86 outputs a control signal $85_3$ for controlling the level of an outputted interference replica signal, rather than the control signal $15_3$ for controlling the turning on and off of the interference cancellation process. The multiplier 35 multiplies the output signal from the multiplier 29 by a coefficient a ($0 \leq \alpha \leq 1$) represented by a control signal $85_4$ outputted from the ICU 92b, and outputs the product as an interference replica signal 82a.

The DS-CDMA multiuser interference canceler according to the third embodiment operates in exactly the same manner as with the DS-CDMA multiuser interference canceler according to the first embodiment by setting the coefficient α to α=1 or 0. Since the coefficient α is in the range of $0 \leq \alpha \leq 1$, when the reception quality is close to a boundary of degradation in the quality, the interference cancellation process is not simply turned off, but the coefficient a is set to an intermediate value, e.g., 0.5, between 0 and 1 for making the reception quality more uniform.

The control process performed by the DS-CDMA multiuser interference canceler according to the present invention is a feedback control process. Therefore, the DS-CDMA multiuser interference canceler controls the interference cancellation process immediately after the reception quality at a certain point in time, judging from the reception quality. Therefore, the control process necessarily suffers a delay. If the reception quality changes in short periodic cycles, then simply turning on and off the interference cancellation process as in the first and second embodiments may not allow the interference cancellation process to follow the change in the reception quality, but may possibly degrade the reception quality. According to the third embodiment, however, when the reception quality changes, the DS-CDMA multiuser interference canceler initially sets the coefficient a to a value close to 0 and thereafter increases coefficient α with time. In this manner, the interference cancellation process is less susceptible to the effect of the delay in the control process.

The above principle of the third embodiment is also applicable to the multiuser interference canceler according to the second embodiment. If the principle of the third embodiment is applied to the multiuser interference canceler according to the second embodiment, then the control signals $16_1$–$16_8$ outputted from the cancellation on/off central controller 66 are made equal to the control signals $85_1$–$85_8$.

In the above preferred embodiments of the present invention, the number of users is three and the number of stages is also three. However, the present invention is also applicable to a DS-CDMA multiuser interference canceler where the number of users is other than three and the number of stages is also other than three.

According the present invention, as described above, even when the signal reception environments are poor, such as when the Eb/No of the received signal is low or the received signal is degraded by time-dependent changes due to fading and external noise, the reception quality is prevented from being degraded by the interference cancellation process.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A DS-CDMA multiuser interference canceler for processing a received signal containing spread signals from a plurality of users to remove signals of other users from a signal of each user and thereafter decode the signal of each user, comprising:

a first stage comprising a plurality of series-connected blocks, each block including
a respective first interference canceler unit, for generating and outputting a respective interference replica signal which is substantially identical to respective signal components of respective users, and
a respective first subtracting means for subtracting the respective interference replica signal from the received signal;
a plurality of second stages comprising a plurality of series-connected blocks, each block including
a respective adding means for adding the respective interference replica signal generated in a preceding stage to signals from a preceding block,
a respective second interference canceler unit for generating a second interference replica signal which is substantially identical to the respective signal components of the respective user from output signals from said respective adding means, and
except for the last block in the last stage, a respective second subtracting means for subtracting the second interference replica signal from the output signals from said respective adding means and outputting a differential signal;
a plurality of decoding means for decoding symbols generated in a final one of said second stages; and
a plurality of preliminary demodulating means for measuring a reception quality of the signals of the users contained in the received signal;
each of said interference canceler units, except a first interference canceler unit in the first block in the first stage, comprising means for controlling an interference canceler unit in the preceding block to turn off the outputting of the respective interference replica signal if the reception quality of output signals from the preceding block is more degraded than the reception quality of the signals of the users measured by said preliminary demodulating means.

2. A DS-CDMA multiuser interference canceler for processing a received signal containing spread signals from a plurality of users to remove signals of other users from a signal of each user and thereafter decode the signal of each user, comprising:

a first stage comprising a plurality of series connected blocks each block including
a respective first interference canceler unit for generating and outputting a respective interference replica signal which is substantially identical to respective signal components of a respective user, and measuring a reception quality of the signals of the respective user, and
a respective first subtracting means for subtracting the respective interference replica signal from the received signal;
a plurality of second stages comprising a plurality of series-connected blocks each block including
a respective adding means for adding the respective interference replica signal generated in a preceding stage to signals from a preceding block,
a respective second interference canceler unit for generating a second interference replica signal which is substantially identical to the respective signal components of the respective user from output signals from said respective adding means and measuring the reception quality of the signals of the respective user,
and except for the last block in the last stage, a respective second subtracting means for subtracting the second interference replica signal from the output signals from said respective adding means and outputting a differential signal;
a plurality of decoding means for decoding symbols generated in a final one of said second stages;
a plurality of preliminary demodulating means for measuring the reception quality of the signals of the users contained in the received signal; and
cancellation on/off central control means for controlling a particular interference canceler unit in any one of the stages but the last stage to turn off the outputting of the respective interference replica signal if the reception quality measured by a particular second interference canceler unit is more degraded than the reception quality measured by said preliminary demodulating means, until the reception quality measured by all the interference canceler units in the same stage as the particular interference canceler unit is better than the reception quality measured by said preliminary demodulating means.

3. The DS-CDMA multiuser interference canceler according to claim 2, wherein the particular interference canceler unit is the interference canceler unit, whose reception quality is the worst in the stage including the particular interference canceler unit.

4. A DS-CDMA multiuser interference canceler for processing a received signal containing spread signals from a plurality of users to remove signals of other users from a signal of each user and thereafter decode the signal of each user, comprising:
- a first stage comprising
  - a plurality of first interference canceler units for generating and outputting respective interference replica signals which are substantially identical to signal components of the users, and measuring a reception quality of the signals of the users,
  - first adding means for adding said respective interference replica signals, and
  - first subtracting means for subtracting an output signal of said first adding means from the received signal;
- a plurality of second stages comprising
  - a plurality of second adding means for adding respective interference replica signals of the users generated in a preceding stage to signals output from a subtracting means from a preceding block,
  - respective second interference canceler units for generating respective second interference replica signals which are substantially identical to the signal components of the users from output signals from said second adding means and measuring the reception quality of the signals of the users,
  - respective third adding means for adding the respective second interference replica signals and
  - respective second subtracting means for subtracting an output signal of said third adding means from the received signal and outputting a differential signal to a next stage;
- a plurality of decoding means for decoding symbols generated in a final one of said second stages;
- a plurality of preliminary demodulating means for measuring reception quality of the signals of the users contained in the received signal; and
- cancellation on/off central control means for controlling a particular interference canceler unit in any one of the stages but the last stage to turn off the outputting of the respective interference replica signal if the reception quality measured by a particular second interference canceler unit is more degraded than the reception quality measured by said preliminary demodulating means, until the reception quality measured by all the interference canceler units in the same stage as the particular interference canceler unit is better than the reception quality measured by said preliminary demodulating means.

5. The DS-CDMA multiuser interference canceler according to claim 4, wherein the interference canceler unit, whose reception quality is the worst in the stage including the particular interference canceler unit.

6. A DS-CDMA multiuser interference canceler for processing a received signal containing spread signals from a plurality of users to remove signals of other users from a signal of each user and thereafter decode the signal of each user, comprising:
- a first stage comprising a plurality of series-connected blocks, each block including
  - a respective first interference canceler unit for generating and outputting a respective interference replica signal which is substantially identical to respective signal components of respective users, and
  - respective first subtracting means for subtracting the respective interference replica signal from the received signal;
- a plurality of second stages comprising a plurality of series-connected blocks, each block including a respective adding means for adding the respective interference replica signal generated in a preceding stage to signals from a preceding block,
  - a respective second interference canceler unit for generating a second interference replica signal which is substantially identical to the respective signal components of the respective user from output signals from said respective adding means, and
  - except for the last block in the last stage, a respective second subtracting means for subtracting the second interference replica signal from the output signals from said respective adding means and outputting a differential signal;
- a plurality of decoding means for decoding symbols generated in a final one of said second stages; and
- a plurality of preliminary demodulating means for measuring a reception quality of the signals of the users contained in the received signal;
- each of said interference canceler units except for a first interference canceler unit in a first block in a first stage, comprising means for controlling an interference canceler unit in the preceding block to reduce an output level of the respective interference replica signal if the reception quality of output signals from the preceding block is more degraded than the reception quality of the signals of the users measured by said preliminary demodulating means.

7. A DS-CDMA multiuser interference canceler for processing a received signal containing spread signals from a plurality of users to remove signals of other users from a signal of each user and thereafter decode the signal of each user, comprising:
- a first stage comprising a plurality of series-connected blocks each block including
  - a respective first interference canceler unit for generating and outputting a respective interference replica signal which is substantially identical to respective signal components of the respective user, and measuring a reception quality of the signals of the respective user, and
  - a respective first subtracting means for subtracting the respective interference replica signal from the received signal;
- a plurality of second stages comprising a plurality of series-connected blocks, each block including
  - a respective adding means for adding the respective interference replica signal generated in a preceding stage to signals from a preceding block, a respective second interference canceler unit for generating a second interference replica signal which is substantially identical to the respective signal components of the respective user from output signals from said respective adding means and measuring the reception quality of the signals of the respective user, and except for the last block in the last stage, a respective second subtracting means for subtracting the interference replica signal from the output signals from said respective adding means and outputting a differential signal;

a plurality of decoding means for decoding symbols generated in a final one of said second stages;

a plurality of preliminary demodulating means for measuring the reception quality of the signals of the users contained in the received signal; and cancellation on/off central control means for controlling a particular interference canceler unit in any one of the stages but the last stage to reduce an output level of the respective interference replica signal if the reception quality measured by a particular second interference canceler unit is more degraded than the reception quality measured by said preliminary demodulating means, until the reception quality measured by all the interference canceler units in the same stage as the particular interference canceler unit is better than the reception quality measured by said preliminary demodulating means.

8. The DS-CDMA multiuser interference canceler according to claim 7, wherein the particular interference canceler unit is the interference canceler unit, whose reception quality is the worst in the stage including the particular interference canceler unit.

9. A DS-CDMA multiuser interference canceler for processing a received signal containing spread signals from a plurality of users to remove signals of other users from a signal of each user and thereafter decode the signal of each user, comprising:

a first stage comprising
　a plurality of first interference canceler units for generating and outputting respective interference replica signals which are substantially identical to signal components of the users, and measuring a reception quality of the signals of the users,
　first adding means for adding said respective interference replica signals, and
　a first subtracting means for subtracting an output signal of said first adding means from the received signal;

a plurality of second stages comprising
　a plurality of second adding means for adding respective interference replica signals of the users generated in a preceding stage to signals output from a subtracting means from a preceding stage,
　respective second interference canceler units for generating respective second interference replica signals which are substantially identical to the signal components of the users from output signals from said second adding means and measuring the reception quality of the signals of the users,
　respective third adding means for adding the respective second interference replica signals and
　respective second subtracting means for subtracting an output signal of said third adding means from the received signal and outputting a differential signal to a next stage;

a plurality of decoding means for decoding symbols generated in a final one of said second stages;

a plurality of preliminary demodulating means for measuring reception quality of the signals of the users contained in the received signal; and cancellation on/off central control means for controlling a particular interference canceler unit in any one of the stages but the last stage to reduce an output level of the respective interference replica signal if the reception quality measured by a particular second interference canceler unit is more degraded than the reception quality measured by said preliminary demodulating means, until the reception quality measured by all the interference canceler units in the same stage as the particular interference canceler unit is better than the reception quality measured by said preliminary demodulating means.

10. The DS-CDMA multiuser interference canceler according to claim 9, wherein the particular interference canceler unit is the interference canceler unit whose reception quality is the worst in a stage including the particular interference canceler unit.

11. The DS-CDMA multiuser interference canceler according to claim 1, wherein said reception quality comprises Eb/No.

12. The DS-CDMA multiuser interference canceler according to claim 1, wherein said reception quality comprises bit error rate of a pilot symbol.

13. The DS-CDMA multiuser interference canceler according to claim 1, wherein said reception quality comprises Eb/No and bit error rate of a pilot symbol.

* * * * *